United States Patent
Liu

(10) Patent No.: US 12,069,680 B2
(45) Date of Patent: Aug. 20, 2024

(54) METHOD AND DEVICE FOR TRANSMITTING DATA

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 17/432,869

(22) PCT Filed: Feb. 21, 2019

(86) PCT No.: PCT/CN2019/075697
§ 371 (c)(1),
(2) Date: Aug. 20, 2021

(87) PCT Pub. No.: WO2020/168513
PCT Pub. Date: Aug. 27, 2020

(65) Prior Publication Data
US 2022/0061083 A1  Feb. 24, 2022

(51) Int. Cl.
*H04W 72/23* (2023.01)
(52) U.S. Cl.
CPC .................................. *H04W 72/23* (2023.01)
(58) Field of Classification Search
None
See application file for complete search history.

(56) References Cited

U.S. PATENT DOCUMENTS

| 9,014,131 | B2 | 4/2015 | Yang et al. |
| 9,167,577 | B2 | 10/2015 | Yang et al. |
| 9,300,441 | B2 | 3/2016 | Yang et al. |
| 9,854,575 | B2 | 12/2017 | Yang et al. |
| 2014/0307695 | A1 | 10/2014 | Yang et al. |
| 2015/0181581 | A1 | 6/2015 | Yang |
| 2015/0358125 | A1 | 12/2015 | Yang et al. |
| 2016/0174204 | A1 | 6/2016 | Yang et al. |
| 2018/0227102 | A1 | 8/2018 | John Wilson et al. |

(Continued)

FOREIGN PATENT DOCUMENTS

| CN | 104012023 A | 8/2014 |
| CN | 104811263 A | 7/2015 |
| CN | 108024317 A | 5/2018 |

(Continued)

OTHER PUBLICATIONS

First Office Action of the Chinese application No. 201980000185.7, issued on Jun. 2, 2021, (20 pages).

(Continued)

*Primary Examiner* — Chi H Pham
*Assistant Examiner* — Raul Rivas
(74) *Attorney, Agent, or Firm* — Arch & Lake LLP

(57) ABSTRACT

A method and a device for transmitting data are provided. The method includes that a user equipment (UE) detects at least two target Physical Downlink Control Channels (PDCCHs), where each PDCCH carries target Downlink Control Information (DCI) for scheduling a target UE. Additionally, when the target DCI is detected on a target PDCCH, the UE receives downlink data sent by access network equipment to the target UE as scheduled by the target DCI.

18 Claims, 11 Drawing Sheets

Target UE performs detection on n target Physical Downlink Control Channels (PDCCH). Each PDCCH of the n target PDCCHs carries target Downlink Control Information (DCI). The target DCI is configured for scheduling the target UE — 201

When the target DCI is detected on at least one PDCCH of the n target PDCCHs, the target UE receives, as scheduled by the target DCI, downlink communication data sent by access network equipment — 202

(56) References Cited

U.S. PATENT DOCUMENTS

2019/0200362 A1* 6/2019 Won .................... H04L 25/067

FOREIGN PATENT DOCUMENTS

| CN | 108633007 A | 10/2018 | | |
|---|---|---|---|---|
| SE | US-20220022066 A1 * | 1/2022 | ............ | H04W 24/08 |
| WO | 2013127453 A1 | 9/2013 | | |
| WO | WO-2017018758 A1 * | 2/2017 | ........... | H04L 5/0053 |
| WO | 2018148002 A1 | 8/2018 | | |

OTHER PUBLICATIONS

English translation of the Written Opinion of the International Search Authority in the international application No. PCT/CN2019/075697, mailed on Nov. 15, 2019, (3 pages).

International Search Report of PCT Application No. PCT/CN2019/075697 dated Nov. 15, 2019 with English translation, (4p).

Fujitsu, "Multi-Beam Operation for NR-PDCCH", Discussion and Decision, 3GPP TSG RAN WG1 Meeting NR#3, R1-1715485, Nagoya, Japan, Sep. 21, 2017, (4p).

* cited by examiner

METHOD AND DEVICE FOR TRANSMITTING DATA

CROSS-REFERENCE TO RELATED APPLICATIONS

This application is the U.S. national phase application of International Application No. PCT/CN2019/075697, filed on Feb. 21, 2019, the entire contents of which are incorporated herein by reference for all purposes.

TECHNICAL FIELD

The present disclosure relates to the field of wireless communication technology, and more particularly, to a method, device, and system for transmitting data, and a storage medium.

BACKGROUND

At present, many communication services (e.g., telemedicine services, Internet of Vehicles services, industrial control services, etc.) require high reliability. The reliability may be characterized by a probability that a receiving end correctly receives communication data sent by a transmitting end.

Generally, the probability has to be 99.9999% or more for a service requiring high reliability. In a practical application, User Equipment (UE) in general has to receive downlink data as scheduled by Downlink Control Information (DCI). When DCI is not received correctly, UE cannot receive downlink data. Therefore, a probability that UE correctly receives DCI will directly affect a probability that the UE receives downlink data, thereby affecting reliability of a communication service.

At present, there is a pressing need for improving probability that UE receives DCI correctly for a service requiring high reliability.

SUMMARY

The present disclosure provides a method and device for transmitting data, capable of improving probability that UE correctly receives DCI.

According to a first aspect of the present disclosure, there is provided a method for transmitting data. The method includes that a UE detects n target Physical Downlink Control Channels (PDCCHs), where each PDCCH of the n target PDCCHs carries target DCI, and the target DCI is configured for scheduling a target UE.

Additionally, in response to detecting the target DCI on a target PDCCH, the UE receives, as scheduled by the target DCI, downlink data sent by access network equipment to the target UE.

According to a second aspect of the present disclosure, there is provided a method for transmitting data.

The method includes that an access network equipment generates target DCI for scheduling a target UE, where the target UE is configured to receive, as scheduled by the target DCI, downlink data sent by the access network equipment to the target UE.

Additionally, the access network equipment sends the target DCI respectively through n target PDCCHs, where n is an integer greater than one.

According to a third aspect of the present disclosure, there is provided a device for transmitting data. The device includes a processor and a memory configured to store processor executable instructions.

The processor is configured to detect n target PDCCHs, where each PDCCH of the n target PDCCHs carries target DCI, the target DCI is configured for scheduling the target UE, and n is an integer greater than one.

Furthermore, the processor is configured to: in response to detecting the target DCI on at least one PDCCH of the n target PDCCHs, receive, as scheduled by the target DCI, downlink data sent by an access network equipment to the target UE.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Figure 1:
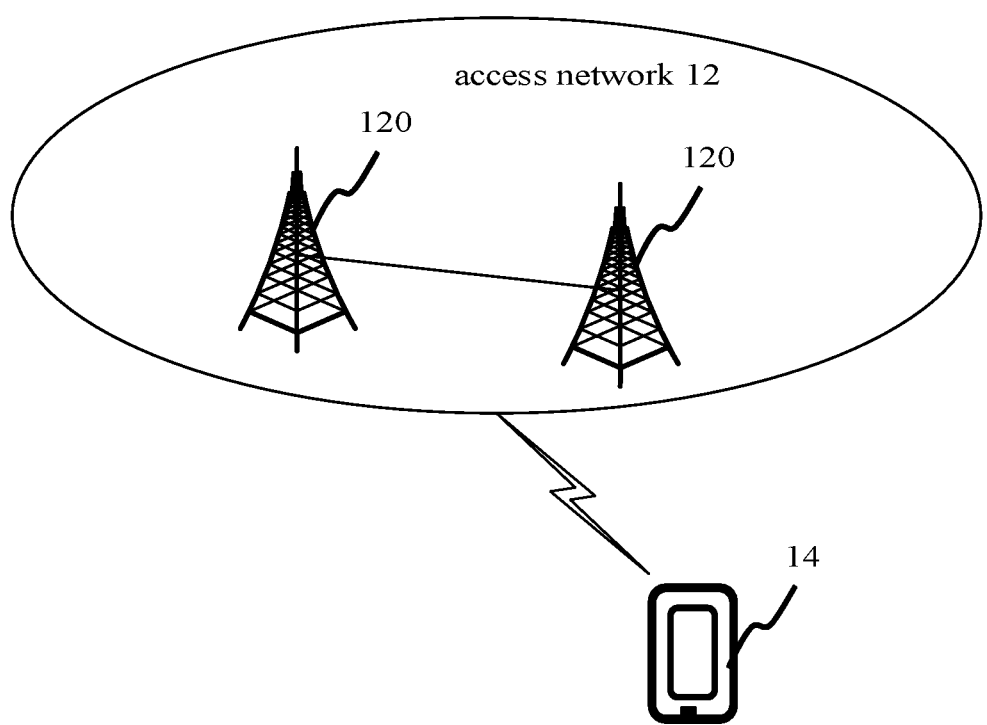
FIG. 1 is a diagram of a communication system according to an illustrative embodiment.

To clearly show a technical problem to be solved, a technical solution, and beneficial effects of the present disclosure, implementation of the present disclosure is further elaborated below with reference to the drawings.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims.

The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

It should be understood that herein by "a number of", it means one or more, and by "multiple", it means two or more. A term "and/or" describes an association between associated objects, including three possible relationships. For example, by A and/or B, it may mean that there may be three cases, namely, existence of but A, existence of both A and B, or existence of but B. A slash mark "/" generally denotes an "or" relationship between two associated objects that come respectively before and after the mark per se.

A base station may send DCI to UE through a PDCCH. The DCI may indicate a time-frequency location of a communication resource occupied by downlink data sent by the base station to the UE. The UE may receive the downlink data sent by the base station to the UE at the time-frequency location as scheduled by the DCI.

In an actual application, when DCI sent by the base station is not received correctly, the UE cannot determine the time-frequency location of the communication resource occupied by the downlink data sent by the base station to the UE, and then cannot correctly receive the downlink data. Therefore, whether the UE can correctly receive the DCI sent by the base station directly affects whether the UE can correctly receive the downlink data sent by the base station, and then affects the reliability of a communication service.

At present, there is a pressing need for improving probability that UE receives DCI correctly for a service requiring high reliability.

Embodiments of the present disclosure provide a method for transmitting data. In the method for transmitting data, a base station may at least twice send DCI to UE. For example, the base station may send, to the UE through a first PDCCH, DCI for scheduling the UE. Meanwhile, the base station may also send the DCI to the UE through a second PDCCH. In this way, the UE has at least two opportunities to receive the DCI. When reception of the DCI borne on one PDCCH fails, the UE may receive the DCI on the other PDCCH. Therefore, with the method for transmitting data provided in embodiments of the present disclosure, probability that the UE correctly receives the DCI is improved, thereby improving reliability of a communication service.

A communication system according to an illustrative embodiment of the present disclosure is described below. As shown in FIG. 1, the communication system according to an embodiment of the present disclosure includes an access network 12 and target User Equipment (UE) 14, which also may be referred to simply as UE.

The access network 12 includes a number of access network equipment 120. The access network equipment 120 communicate with core network equipment 110 via an interface technology, such as an S1 interface in an LTE system, an NG interface in an 5G NR system, etc. The access network equipment 120 may be a base station. The base station may be a device deployed in the access network for providing a wireless communication function to target UE. The base station may include various forms of macro stations, micro base stations, relays, access points, etc. In systems employing different radio access technologies, the name of equipment having a base station function may differ. For example, the equipment may be referred to as an eNodeB or an eNB in an LTE system, or a gNodeB or gNB in a 5GNR system, etc. Description of the name "base station" may vary as the communication technology evolves.

Target UE 14 may include various equipment having a wireless communication function, such as handheld equipment, onboard equipment, wearable equipment, computing equipment, or other processing equipment connected to a wireless modem, as well as various forms of Mobile Stations (MS), target UE (namely, terminal device), etc. For convenience of description, the equipment mentioned above may collectively be referred to as target UE. An access network equipment 120 communicates with target UE14 via an air interface technology such as a Uu interface.

Figure 2:
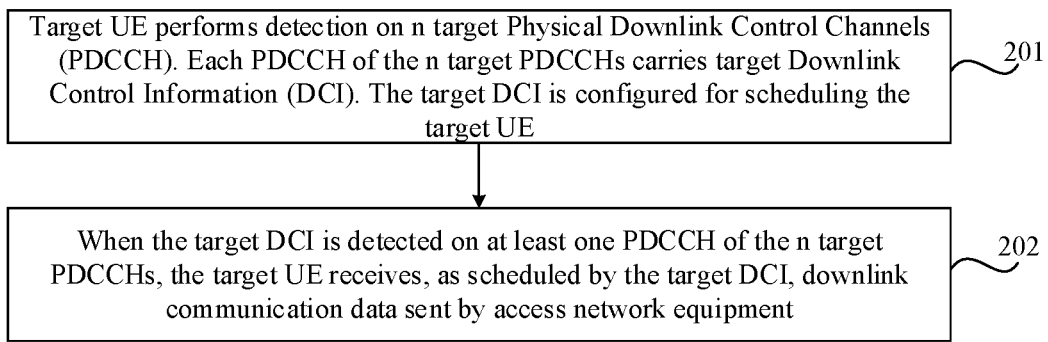
FIG. 2 is a flowchart of a method for transmitting data according to an illustrative embodiment.

FIG. 2 is a flowchart of a method for transmitting data according to an illustrative embodiment. As shown in FIG. 2, the method is applied in target UE 14 shown in FIG. 1. The method includes a step as follows.

In S201, target UE performs detection on n target Physical Downlink Control Channels (PDCCHs). Each PDCCH of the n target PDCCHs carries target Downlink Control Information (DCI). The target DCI is configured for scheduling the target UE.

In S202, when the target DCI is detected on at least one PDCCH of the n target PDCCHs, the target UE receives, as scheduled by the target DCI, downlink data sent by access network equipment.

To sum up, with the method for transmitting data provided in embodiments of the present disclosure, target UE performs detection on n target PDCCH. Each PDCCH of the n target PDCCHs carries target DCI for scheduling the target UE. When the target DCI is detected on a target PDCCH, the target UE may receive downlink data sent by access network equipment as scheduled by the target DCI. As the n target PDCCHs all carry the target DCI, the target UE has n opportunities to receive the target DCI. When one reception of the target DCI fails, the target UE may receive the target DCI on another target PDCCH, thereby increasing probability in receiving the target DCI correctly by the target UE, ensuring reliability of a communication service.

Figure 3:
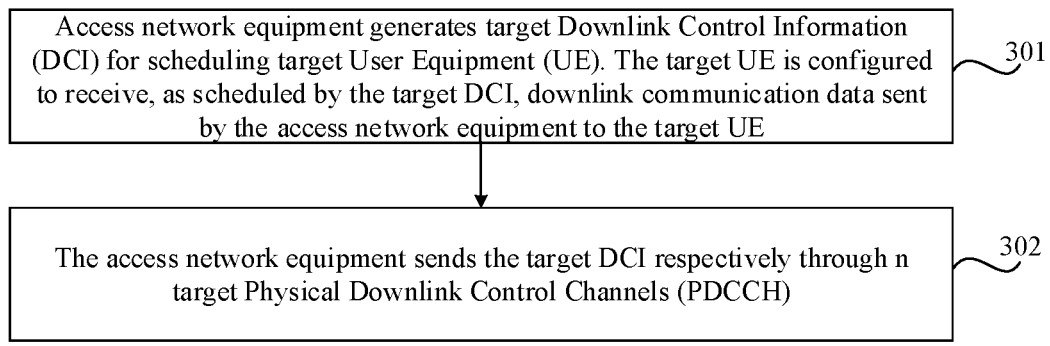
FIG. 3 is a flowchart of a method for transmitting data according to an illustrative embodiment.

FIG. 3 is a flowchart of a method for transmitting data according to an illustrative embodiment. As shown in FIG. 3, the method is applied in access network equipment 120 shown in FIG. 1. The method includes a step as follows.

In S301, access network equipment generates target Downlink Control Information (DCI) for scheduling target User Equipment (UE). The target UE is configured to receive, as scheduled by the target DCI, downlink data sent by the access network equipment to the target UE.

In S302, the access network equipment sends the target DCI respectively through n target Physical Downlink Control Channels (PDCCHs).

To sum up, with the method for transmitting data provided in embodiments of the present disclosure, target DCI for scheduling target UE is sent by access network equipment respectively on n target PDCCHs, so that the target UE has n opportunities to receive the target DCI. When one reception of the target DCI fails, the target UE may receive the target DCI on another target PDCCH, thereby increasing probability in receiving the target DCI correctly by the target UE, ensuring reliability of a communication service.

Figure 4:
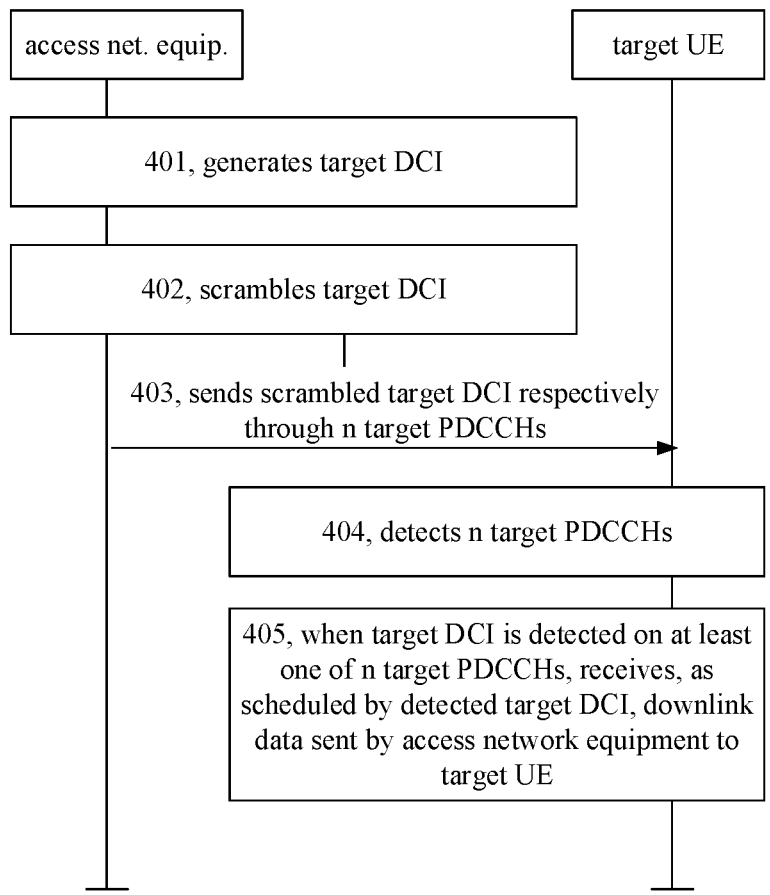
FIG. 4 is a flowchart of a method for transmitting data according to an illustrative embodiment.

FIG. 4 is a flowchart of a method for transmitting data according to an illustrative embodiment. As shown in FIG. 4, the method is applied in the communication system shown in FIG. 1. The method includes a step as follows.

In S401, access network equipment generates target DCI.

As described, access network equipment has to schedule UE through DCI, so that the UE receives, as scheduled by the DCI, downlink data sent by the access network equipment to the UE. Therefore, in the process of sending the downlink data to the UE, the access network equipment has to generate the DCI and send the DCI to the UE.

Analogously, in the process of sending the downlink data to the target UE, the access network equipment may generate the target DCI, and send the target DCI to the target UE at least twice in a subsequent step. The target DCI is configured for scheduling the target UE. The target UE may receive, as scheduled by the target DCI, the downlink data sent by the access network equipment to the target UE.

In S402, the access network equipment scrambles the target DCI.

In general, DCI sent by the access network equipment to UE may be scrambled with the Radio Network Temporary Identity (RNTI) of the UE. The RNTI is configured to uniquely identify the UE. In this way, in the process of performing detection on a PDCCH, the UE may use the RNTI to attempt descrambling (or addressing) the DCI carried on the PDCCH, so as to determine, according to the result of the descrambling, whether the DCI carried on the PDCCH is the DCI sent by the access network equipment to the UE.

Before sending the target DCI n times to the target UE, each time the access network equipment has to use an RNTI to scramble the target DCI to be sent to the target UE. The n copies (or pieces) of the target DCI that are sent are the same DCI.

In a possible implementation, each time the access network equipment may scramble the target DCI to be sent to the target UE using the same RNTI. Alternatively, the access network equipment may acquire an RNTI configured for uniquely identifying the target UE (referred to as a first RNTI hereinafter), and scramble each copy of the target DCI to be sent to the target UE using the first RNTI. For example, the access network equipment may send the target DCI to the target UE three times. Before sending the target DCI, the access network equipment may acquire a first RNTI for uniquely identifying the target UE. Then, the access network equipment may scramble the first copy, the second copy, and the third copy of the target DCI to be sent to the target UE using the first RNTI.

In another possible implementation, the access network equipment may scramble copies of the target DCI to be sent to the target UE with different RNTIs. For example, the access network equipment may send the target DCI to the target UE three times. The access network equipment may scramble the first copy of the target DCI to be sent to the target UE using an RNTI-1, scramble the second copy of the target DCI to be sent to the target UE using an RNTI-2, and scramble the third copy of the target DCI to be sent to the target UE using an RNTI-3.

It should be noted that, in implementation of scrambling the target DCI using different RNTIs, in order to ensure that the target UE can identify that the target DCI are the DCI sent by the access network equipment to the target UE, the access network equipment may scramble, using a first RNTI (also referred to as RNTI-1), the first copy of the target DCI that is to be sent by the access network equipment to the target UE for the first time. Thus, when the target UE successfully descrambles the DCI carried on a PDCCH using the first RNTI, the target UE may determine that the PDCCH is the target PDCCH, and the PDCCH carries the target DCI. Meanwhile, the target UE may further determine that the other n−1 PDCCHs adjacent to the first PDCCH in the time domain are all target PDCCHs. That is, the other n−1 PDCCHs adjacent to the first PDCCH in the time domain all carry the target DCI. A target PDCCH is a PDCCH carrying the target DCI. By neighboring the first PDCCH in the time domain, it means that a scheduling unit in which another target PDCCH is located is adjacent to a scheduling unit in which the first PDCCH is located. For example, the scheduling unit may be a mini slot, a slot, etc. The n is a number of times the access network equipment sends the target DCI.

In an implementation of scrambling the target DCI using n RNTIs, the access network equipment may implicitly deliver target indication information to the target UE using the first sequence of the n RNTIs. For example, when the target UE is a remote control drone, the access network equipment may deliver target indication information for indicating a flight direction to the remote control drone using a first sequence of different RNTIs used to scramble the target DCI.

Alternatively, in the process that the access network equipment delivers the target indication information to the target UE using the first sequence of different RNTIs, the access network equipment may acquire n RNTIs corresponding to the target indication information, and then the access network equipment may scramble the n pieces of the target DCI respectively using the n RNTIs according to the first sequence. In this way, after the target UE has descrambled the n pieces of the target DCI to acquire the first sequence of the n RNTIs, the target UE may acquire the target indication information corresponding to the first sequence, thereby achieving implicit delivery of the target indication information.

In actual implementation, the access network equipment may maintain a correspondence table that includes a correspondence table between a sequence of RNTIs and indication information. The correspondence table may include at least one correspondence. Each correspondence may be indication information and a correspondence between a sequence of n RNTIs. In a process that the access network equipment delivers the target indication information to the target UE using a sequence of different RNTIs, the access network equipment may search the correspondence table based on the target indication information, to acquire a first sequence of n RNTIs corresponding to the target indication information. Then, the access network equipment may scramble the n pieces of the target DCI using the n RNTIs sequentially according to the first sequence.

Table 1 is a correspondence table between indication information and a sequence of n RNTIs provided by an illustrative embodiment of the present disclosure.

TABLE 1

| RNTI used by access net. eq. in scrambling each target DCI | | | |
|---|---|---|---|
| RNTI for scrambling 1st DCI | RNTI for scrambling 2nd DCI | RNTI for scrambling 3rd DCI | Indication information |
| RNTI1 | RNTI1 | RNTI1 | 1 |
| RNTI1 | RNTI1 | RNTI2 | 2 |
| RNTI1 | RNTI1 | RNTI3 | 3 |
| RNTI1 | RNTI2 | RNTI1 | 4 |
| RNTI1 | RNTI2 | RNTI2 | 5 |
| RNTI1 | RNTI2 | RNTI3 | 6 |
| RNTI1 | RNTI3 | RNTI1 | 7 |
| RNTI1 | RNTI3 | RNTI2 | 8 |
| RNTI1 | RNTI3 | RNTI3 | 9 |

As shown in Table 1, the first sequence of RNTI-1, RNTI-2, and RNTI-3 corresponds to indication information #6. When the target indication information to be implicitly delivered by the access network equipment to the target UE is the indication information No. 6, the access network equipment may acquire, through Table 1, the first sequence of three RNTIs corresponding to the indication information No. 6, that is, RNTI-1, RNTI-2, and RNTI-3. Then, the access network equipment may scramble the target DCI to be sent to the target UE for the first time using the RNTI-1, scramble the target DCI to be sent to the target UE for the second time using the RNTI-2, and scramble the target DCI to be sent to the target UE for the third time using the RNTI-3. To ensure that the target UE can identify the target DCI to be the DCI sent to the target UE by the access network equipment, the RNTI-1 may be an RNTI for uniquely identifying the target UE (referred to as a first RNTI herein).

In S403, the access network equipment may send scrambled target DCI respectively through n target PDCCHs.

After scrambling the target DCI, the access network equipment may send the target DCI to the target UE through n target PDCCHs. For example, when the access network equipment has to send the target DCI to the target UE three times (that is, in the case of n=3), the access network equipment may send the target DCI to the target UE for the first time through a target PDCCH-1, send the target DCI to the target UE for the second time through a target PDCCH-2, and send the target DCI to the target UE for the third time through a target PDCCH-3.

Normally, in order to ensure the reliability of the DCI transmission, the access network equipment may send DCI using a PDCCH of a high aggregation level. In embodiments of the present disclosure, since the access network equipment has adopted the repeated transmission mode to ensure the reliability of the target DCI transmission, the access network equipment may adopt a PDCCH of a low aggregation level to send the target DCI, thereby saving communication resources. Of course, in order to further increase the reliability of the target DCI transmission, in case the access network equipment ensures the reliability of the target DCI transmission by repeated transmission, the access network equipment may also send the target DCI using a PDCCH of a high aggregation level.

In embodiments of the present disclosure, before sending the target DCI, the access network equipment may also determine a non-using aggregation level for a target PDCCH. As described, in order to save communication resources, the access network equipment has to avoid using a PDCCH of a high aggregation level to send the target DCI. In this case, the access network equipment may determine an aggregation level higher than a first preset aggregation level threshold as a non-using aggregation level for a target PDCCH. The first preset aggregation level threshold may be set in advance by a skilled person. For example, the first preset aggregation level threshold may be 4 or 8, etc. In addition, in order to further ensure the reliability of the target DCI transmission, the access network equipment has to send the target DCI using a PDCCH of a high aggregation level. In this case, the access network equipment may determine an aggregation level lower than a second preset aggregation level threshold as a non-using aggregation level for a target PDCCH. The second preset aggregation level threshold may be set by a skilled person in advance as well. For example, the second preset aggregation level threshold may be 2 or 4, etc. Of course, the access network equipment may also determine the non-using aggregation level for a target PDCCH as specified by a communication protocol.

After determining the non-using aggregation level for the target PDCCHs, the access network equipment may map the target DCI respectively to n target PDCCH. The aggregation level of each target PDCCH is an aggregation level other than any non-using aggregation level.

It should be noted that the access network equipment may further send number-of-times indication information to the target UE. The number-of-times indication information is configured to indicate the number n of times the access network equipment sends the target DCI. After receiving the number-of-times indication information, the target UE may determine the number n of times indicated by the number-of-times indication information as the number of target PDCCHs. Each target PDCCH carries one copy of the target DCI.

Alternatively, the aggregation levels used by the n pieces of the target DCI are the same or different. For example, the aggregation levels used by at least two of the n pieces of the target DCI are different.

In S404, the target UE may perform detection on the n target PDCCHs.

In embodiments of the present disclosure, before performing detection on a target PDCCH, the target UE has to determine a non-using aggregation level for the PDCCH.

In a possible implementation, the target UE may determine a non-using aggregation level for a target PDCCH as specified by a communication protocol. In another possible implementation, the target UE may determine a non-using aggregation level for a target PDCCH as indicated by the access network equipment. Alternatively, the access network equipment may send a set of aggregation levels not used to the target UE. The set of aggregation levels not used may include the aggregation level(s) not used for a target PDCCH. The target UE may determine a non-using aggregation level for a target PDCCH according to the set of aggregation levels not used. Alternatively, the access network equipment may send a set of using aggregation levels to the target UE. The set of using aggregation levels may include the using aggregation level(s) usable for a target PDCCH. The target UE may determine any aggregation level other than the using aggregation levels as the non-using aggregation level for a target PDCCH.

After determining the non-using aggregation level for a target PDCCH, the target UE may perform detection on the target PDCCH based on other aggregation level than the non-using aggregation level. Since the target UE does not have to perform detection on the target PDCCH based on all aggregation levels, the number of detections the target UE performs on the target PDCCH may be reduced, reducing complexity in detecting a target PDCCH by the target UE.

In S405, when the target DCI is detected on a target PDCCH, the target UE may receive, as scheduled by the detected target DCI, downlink data sent by the access network equipment to the target UE.

In a possible implementation, each piece of the target DCI sent by the access network equipment to the target UE can schedule the target UE independently. In this case, when the target DCI is detected on any of the target PDCCHs, the target UE does not have to receive any other piece of the target DCI sent by the access network equipment. In this case, the target UE may stop performing detection on the other n−1 target PDCCHs, and receive the downlink data sent by the access network equipment to the target UE as scheduled by the target DCI.

In another possible implementation, all pieces of the target DCI sent by the access network equipment to the target UE may jointly indicate one piece of scheduling information that may schedule the target UE. That is, the target UE may receive, as scheduled by the scheduling information, the downlink data sent by the access network equipment to the target UE. For example, the access network equipment may send the target DCI to the target UE three times. The first piece, the second piece, and the third piece of the target DCI sent by the access network equipment to the target UE may jointly indicate one piece of scheduling information. The UE may receive the downlink data sent by the access network equipment to the target UE as scheduled by the scheduling information. In this case, when the target DCI is detected on the first target PDCCH, the target UE further has to detect the n−1 pieces of the target DCI on the second target PDCCH to the (n−1)-th target PDCCH, and after acquiring all n pieces of the target DCI, acquire the scheduling information according to the n pieces of the target DCI. Then, the target UE may receive, as scheduled by the scheduling information, the downlink data sent by the access network equipment to the target UE.

As described, the access network equipment may scramble each piece of the target DCI sent to the target UE using the same RNTI, or may scramble pieces of the target DCI sent to the target UE using different RNTIs.

In case the access network equipment scrambles the target DCI sent to the target UE each time using the same RNTI, the target UE may perform detection on each target PDCCH based on the same first RNTI. That is, the target UE may perform descrambling to acquire the target DCI carried on each target PDCCH using the first RNTI.

In case the access network equipment scrambles pieces of the target DCI sent to the target UE using different RNTIs, the target UE may perform descrambling to acquire the target DCI carried on a first target PDCCH of the n target PDCCHs in the time domain using the first RNTI.

Meanwhile, the target UE may acquire a set of RNTIs corresponding to each of the n−1 target PDCCHs of the second target PDCCH to the n-th target PDCCH. The set of RNTIs may include at least one RNTI, such as a first RNTI and n−1 second RNTIs.

After acquiring the sets of RNTIs, the target UE may perform detection on each of the second target PDCCH to the n-th target PDCCH using RNTIs in a corresponding set of RNTIs. That is, the target UE may attempt descrambling the target DCI carried by the target PDCCH using each RNTI in the set of RNTIs, or the target UE may attempt descrambling the target DCI carried by the target PDCCH using a second RNTI in the set of RNTIs that has not been used for successful descrambling. When the descrambling is successful, the target UE may acquire the target DCI, and acquire an RNTI used for successfully descrambling the target DCI (the RNTIs used for descrambling the second piece to the n-th piece are referred to as second RNTIs hereinafter). For example, in the example, for a target PDCCH carrying the second piece of the target DCI sent by the access network equipment, the target UE may perform detection on the target PDCCH respectively according to the RNTI-1, the RNTI-2, and the RNTI-3. The target UE may detect the target DCI on the target PDCCH successfully using the RNTI-2. In this case, the target UE may acquire the target DCI, and acquire the RNTI-2 as the second RNTI corresponding to the target PDCCH. For a target PDCCH carrying the third piece of the target DCI sent by the access network equipment, the target UE may perform detection on the target PDCCH respectively according to the RNTI-1, the RNTI-2, and the RNTI-3. The target UE may detect the target DCI on the target PDCCH successfully using the RNTI-3. In this case, the target UE may acquire the target DCI, and also acquire the RNTI-3 as the second RNTI corresponding to the target PDCCH.

Then, the target UE may determine the target indication information for scheduling the target UE according to the first sequence formed by the first RNTI and the n−1 second RNTIs in a one-to-one correspondence with the n−1 target PDCCHs (the second target PDCCH to the n-th target PDCCH).

Alternatively, the access network equipment may send, to the target UE, the correspondence table including at least one correspondence. After acquiring the first sequence corresponding to the first RNTI and the n−1 second RNTIs, the target UE may search the correspondence table to acquire the target indication information corresponding to the first sequence. For example, if the first RNTI acquired by the target UE is the RNTI-1, and the n−1 second RNTIs are the RNTI-2 and the RNTI-3, respectively, then the target UE may search the correspondence table using the first sequence corresponding to the RNTI-1, the RNTI-2, and the RNTI-3, thereby acquiring indication information No. 6 corresponding to the target indication information.

Alternatively, aggregation levels used for the second target PDCCH to the n-th target PDCCH may be the same as the aggregation level used for the first target PDCCH, and/or search spaces used for the second target PDCCH to the n-th target PDCCH may be the same as the search space used for the first target PDCCH. That is, the terminal may determine a search parameter in detecting the target DCI on the first target PDCCH. The search parameter may include at least one of a first aggregation level or a first search space. n−1 pieces of the target DCI may be detected on the second target PDCCH to the n-th target PDCCH using the same search parameter.

To sum up, with the method for transmitting data provided in embodiments of the present disclosure, target UE performs detection on n target PDCCH. Each PDCCH of the n target PDCCHs carries target DCI for scheduling the target UE. When the target DCI is detected on a target PDCCH, the target UE may receive downlink data sent by access network equipment as scheduled by the target DCI. As the n target PDCCHs all carry the target DCI, the target UE has n opportunities to receive the target DCI. When one reception of the target DCI fails, the target UE may receive the target DCI on another target PDCCH, thereby increasing probability in receiving the target DCI correctly by the target UE, ensuring reliability of a communication service.

With the method for transmitting data provided in embodiments of the present disclosure, the access network equipment may scramble n pieces of the target DCI using different RNTIs, and deliver target indication information to a terminal implicitly using a first sequence of the n RNTIs, thereby improving efficiency in data transmission, reducing signaling overhead needed for the target indication information.

With the method for transmitting data provided in embodiments of the present disclosure, the terminal may also detect the target DCI on the second PDCCH to the n-th target PDCCH using the first search space and the first aggregation level same as those used on the first target PDCCH, thereby reducing computation overhead of the terminal in detecting DCI.

It should be noted that the method for transmitting data may be applied in Ultra Reliable Low Latency Communication (URLLC) service transmission in an NR system.

Figure 5:
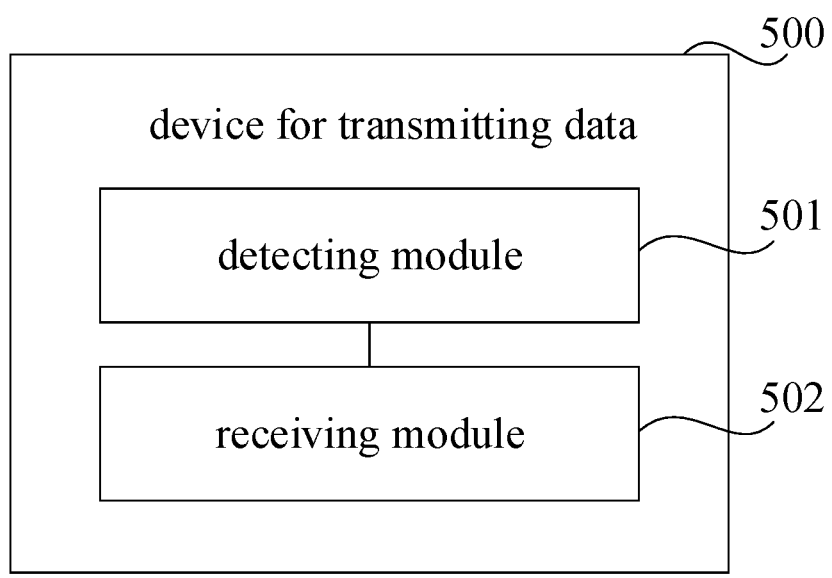
FIG. 5 is a block diagram of a device for transmitting data according to an illustrative embodiment.

FIG. 5 is a block diagram of a device 500 for transmitting data according to an illustrative embodiment. The device 500 may be the terminal 14 shown in FIG. 1. Referring to FIG. 5, the device 500 for transmitting data includes a detecting module 501 and a receiving module 502.

The detecting module 501 is configured to perform detection on n target Physical Downlink Control Channels (PDCCHs). Each PDCCH of the n target PDCCHs carries target Downlink Control Information (DCI). The target DCI is configured for scheduling target User Equipment (UE).

The receiving module 502 is configured to, in response to the target DCI being detected on at least one PDCCH of the n target PDCCHs, receive, as scheduled by the target DCI, downlink data sent by access network equipment to the target UE.

Figure 6:
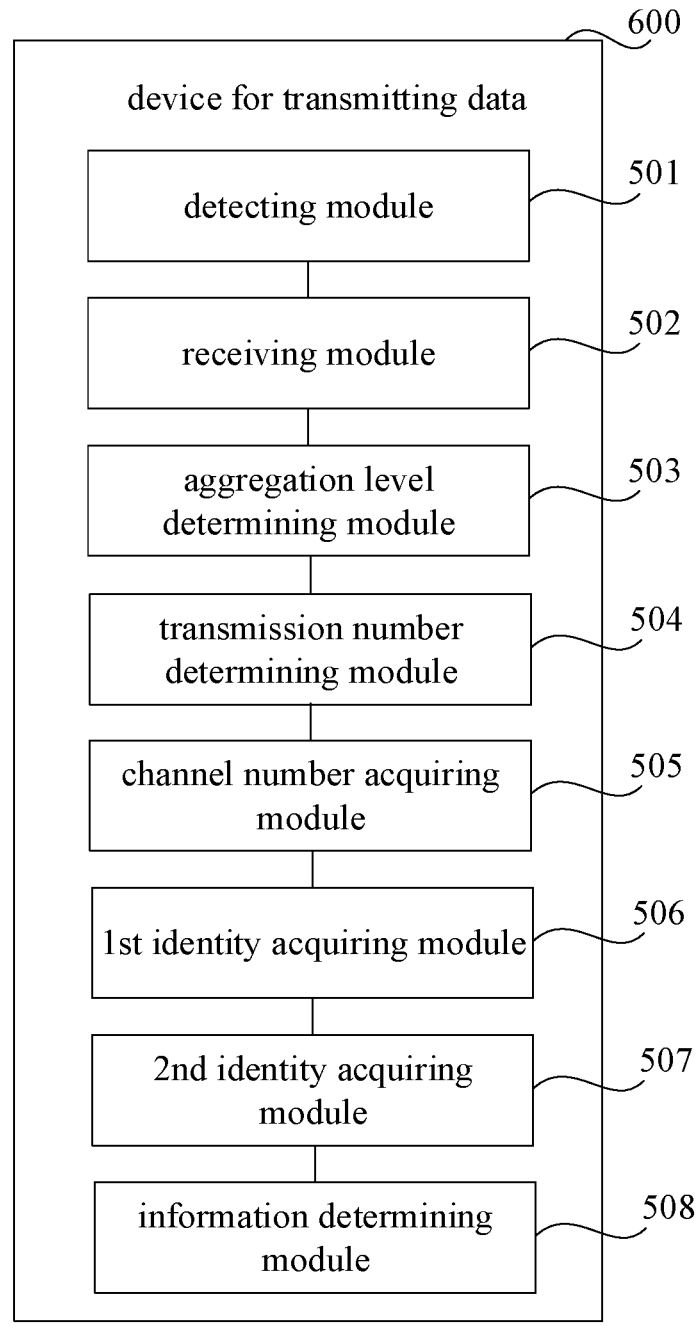
FIG. 6 is a block diagram of a device for transmitting data according to an illustrative embodiment.

As shown in FIG. 6, embodiments of the present disclosure further provide another device 600 for transmitting data. The device 600 for transmitting data may include, in addition to modules included in the device 500 for transmitting data, an aggregation level determining module 503, a transmission number determining module 504, a channel number acquiring module 505, a first identity acquiring module 506, a second identity acquiring module 507, and an information determining module 508.

In an embodiment of the present disclosure, the aggregation level determining module 503 is configured to determine a non-using aggregation level for the n target PDCCHs. Correspondingly, the detecting module 501 may be configured to perform detection on the n target PDCCHs based on other aggregation level than the non-using aggregation level.

Correspondingly, the aggregation level determining module 503 may be configured to: receive a set of aggregation levels not used sent by the access network equipment, the set of aggregation levels not used including an non-using aggregation level for the target PDCCH; or receive a set of using aggregation levels sent by the access network equipment, the set of using aggregation levels including a using aggregation level usable for the target PDCCH, and determine any aggregation level other than the using aggregation levels as the non-using aggregation level for the target PDCCH; or determine the non-using aggregation level for the target PDCCHs as specified by a communication protocol.

In an embodiment of the present disclosure, different aggregation levels are used for at least two of the n target PDCCHs.

In an embodiment of the present disclosure, the transmission number determining module 504 is configured to receive number-of-times indication information sent by the access network equipment. The number-of-times indication information may be configured to indicate a number n of times that the access network equipment sends the target DCI. The channel number acquiring module 505 may be configured to determine the number n of times indicated by the number-of-times indication information as the number n of the target PDCCHs.

In an embodiment of the present disclosure, the receiving module 502 includes a stopping sub-module and a receiving sub-module. The stopping sub-module is configured to, in response to the target DCI being detected on any one of the n target PDCCHs, stop detection on any remaining target PDCCH of the n target PDCCHs. The receiving sub-module may be configured to receive, as scheduled by the target DCI received by the stopping sub-module, the downlink data sent by the access network equipment to the target UE.

In an embodiment of the present disclosure, the receiving module 502 includes a first acquiring sub-module, a second acquiring sub-module, and a receiving sub-module. The first acquiring sub-module may be configured to, in response to the target DCI being detected on a first target PDCCH of the n target PDCCHs, acquire n−1 pieces of the target DCI detected on a second PDCCH to an n-th target PDCCH of the n target PDCCHs. The n may be the number of the target PDCCHs. The n may be an integer greater than one. The second acquiring sub-module may be configured to acquire scheduling information jointly indicated by the n pieces of the target DCI. The receiving sub-module may be configured to receive, according to the scheduling information, the downlink data sent by the access network equipment to the target UE.

In an embodiment of the present disclosure, the first acquiring sub-module is configured to implement: determining a search parameter in detecting the target DCI on the first target PDCCH, the search parameter including at least one of a first aggregation level or a first search space; and detecting the n−1 pieces of the target DCI on the second PDCCH to the n-th target PDCCH using the search parameter.

In an embodiment of the present disclosure, the first acquiring sub-module is configured to implement: acquiring a set of Radio Network Temporary Identities (RNTIs) for the second PDCCH to the n-th target PDCCH, the set of RNTIs including at least one RNTI; performing detection on each of the second PDCCH to the n-th target PDCCH using an RNTI in the set of RNTIs until the target DCI is detected; and acquiring the n−1 pieces of the target DCI detected on the second PDCCH to the n-th target PDCCH.

Correspondingly, the first identity acquiring module may be configured to acquire a first RNTI used to detect the target DCI on a first target PDCCH.

The second identity acquiring module 507 may be configured to acquire n−1 second RNTIs corresponding respectively to the second PDCCH to the n-th target PDCCH. A respective RNTI of the n−1 second RNTIs may be used to detect the target DCI on a target PDCCH corresponding to the respective RNTI.

The information determining module 508 may be configured to determine, according to a first sequence formed by the first RNTI and the n−1 second RNTIs, target indication information for scheduling the target UE.

In embodiments of the present disclosure, the information determining module 508 may be configured to implement: receiving at least one correspondence sent by the access network equipment, each of the at least one correspondence being a correspondence between indication information and a sequence of n RNTIs; and acquiring the target indication information corresponding to the first sequence by searching the at least one correspondence.

In an embodiment of the present disclosure, the first RNTI is configured to uniquely identify the target UE.

To sum up, with the method for transmitting data provided in embodiments of the present disclosure, target UE performs detection on n target PDCCH. Each PDCCH of the n target PDCCHs carries target DCI for scheduling the target UE. When the target DCI is detected on a target PDCCH, the target UE may receive downlink data sent by access network equipment as scheduled by the target DCI. As the n target PDCCHs all carry the target DCI, the target UE has n opportunities to receive the target DCI. When one reception of the target DCI fails, the target UE may receive the target DCI on another target PDCCH, thereby increasing probability in receiving the target DCI correctly by the target UE, ensuring reliability of a communication service.

A module of the device according to an aforementioned embodiment here may perform an operation in a mode elaborated in an aforementioned embodiment of the method herein, which will not be repeated here.

Figure 7:
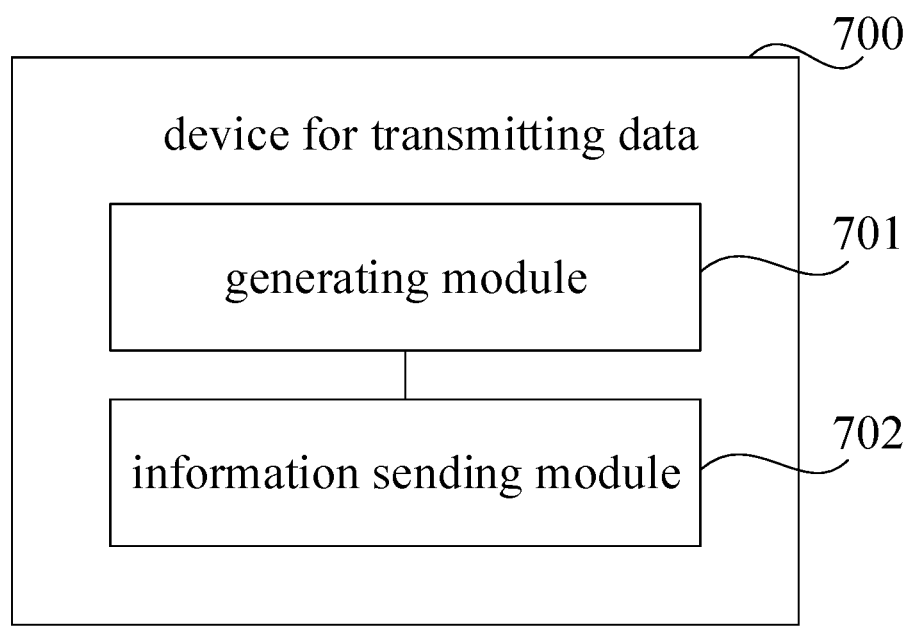
FIG. 7 is a block diagram of a device for transmitting data according to an illustrative embodiment.

FIG. 7 is a block diagram of a device 700 for transmitting data according to an illustrative embodiment. The device 700 for transmitting data a may be an access network equipment 10 shown in FIG. 1. Referring to FIG. 7, the device 700 for transmitting data includes a generating module 701 and an information sending module 702.

The generating module 701 is configured to generate target Downlink Control Information (DCI) for scheduling target User Equipment (UE). The target UE is configured to receive, as scheduled by the target DCI, downlink data sent by access network equipment to the target UE.

The information sending module 702 is configured to send the target DCI respectively through n target Physical Downlink Control Channels (PDCCHs). The n may be an integer greater than one.

In embodiments of the present disclosure, the information sending module 702 is specifically configured to implement: determining a non-using aggregation level for the n target PDCCHs, mapping the target DCI respectively to the n target PDCCHs, and sending the target DCI through the n target PDCCHs. An aggregation level of the n target PDCCHs may be an aggregation level other than the non-using aggregation level.

In an embodiment of the present disclosure, different aggregation levels are used for at least two of the n target PDCCHs.

In embodiments of the present disclosure, n pieces of the target DCI jointly indicate scheduling information. The scheduling information may be configured to schedule the target UE. The n may be a number of times the access network equipment sends the target DCI.

In an embodiment of the present disclosure, the n pieces of the target DCI are detected using one first aggregation level and/or one first search space.

In an embodiment of the present disclosure, n pieces of the target DCI are configured to jointly indicate scheduling information. The scheduling information may be configured to schedule the target UE. The target UE may be configured to receive, according to the scheduling information, the downlink data sent by the access network equipment to the target UE. The n may be a number of times the access network equipment sends the target DCI. The n may be a positive integer greater than or equal to 2.

Correspondingly, the information sending module 702 may be configured to implement: acquiring target indication information for scheduling the target UE; determining a first sequence of n RNTIs corresponding to the target indication information, each of the n RNTIs being located in a set of RNTIs, the set of RNTIs including at least one RNTI; scrambling the n pieces of the target DCI respectively using the n RNTIs according to the first sequence; and sending the n pieces of the target DCI respectively through the n target PDCCHs.

In an embodiment of the present disclosure, the n RNTIs include a first RNTI for scrambling the target DCI carried by the first target PDCCH. The first RNTI may be configured to uniquely identify the target UE.

Figure 8:
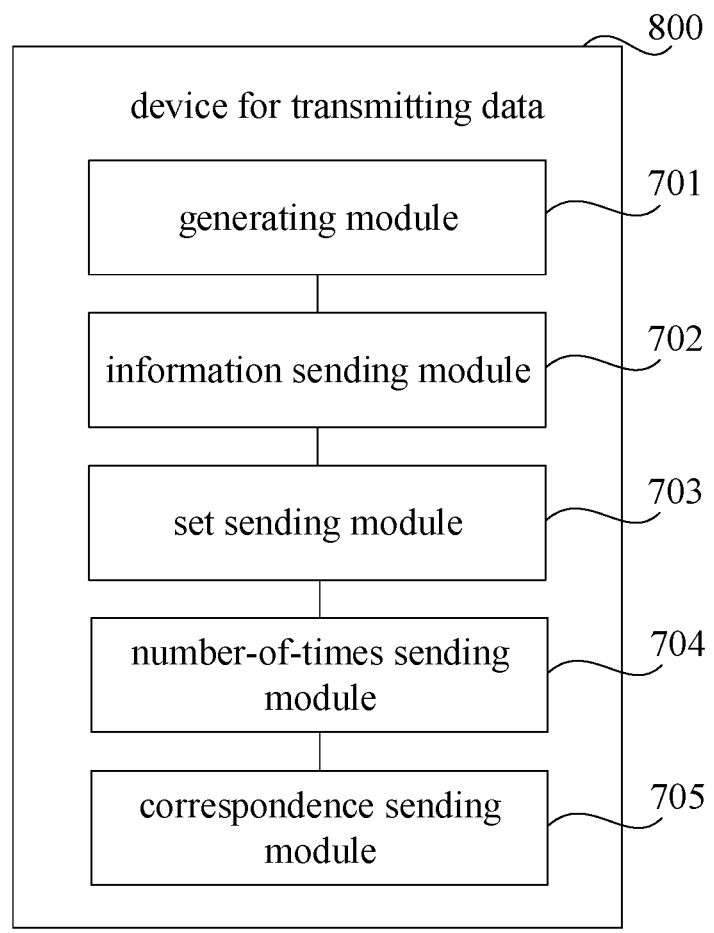
FIG. 8 is a block diagram of a device for transmitting data according to an illustrative embodiment.

As shown in FIG. 8, an embodiment of the present disclosure further provides another device 800 for transmitting data. The device 800 for transmitting data may further include a set sending module 703, a number-of-times sending module 704, and a correspondence sending module 705 in addition to modules included in the device 700 for transmitting data.

The set sending module 703 may be configured to send, to the target UE, a set of aggregation levels not used, the set of aggregation levels not used including an non-using aggregation level for the target PDCCH; or send, to the target UE, a set of using aggregation levels. The set of using aggregation levels may include a using aggregation level usable for the target PDCCH. The non-using aggregation level for the target PDCCH may be any aggregation level other than the using aggregation levels.

The number-of-times sending module 704 may be configured to send number-of-times indication information to the target UE. The number-of-times indication information may be configured to indicate a number n of times that the access network equipment sends the target DCI. The target UE may be configured to determine the number n of times indicated by the number-of-times indication information as the number n of the target PDCCHs. The n may be a positive integer greater than or equal to 2.

The correspondence sending module 705 may be configured to send at least one correspondence to the target UE.

Each of the at least one correspondence may be a correspondence between indication information and a sequence of n RNTIs.

To sum up, with the device for transmitting data provided in embodiments of the present disclosure, target DCI for scheduling target UE is sent respectively on n target PDCCHs, so that the target UE has at least two opportunities to receive the target DCI. When one reception of the target DCI fails, the target UE may receive the target DCI on another target PDCCH, thereby increasing probability in receiving the target DCI correctly by the target UE, ensuring reliability of a communication service.

A module of the device according to an aforementioned embodiment here may perform an operation in a mode elaborated in an aforementioned embodiment of the method herein, which will not be repeated here.

Figure 9:
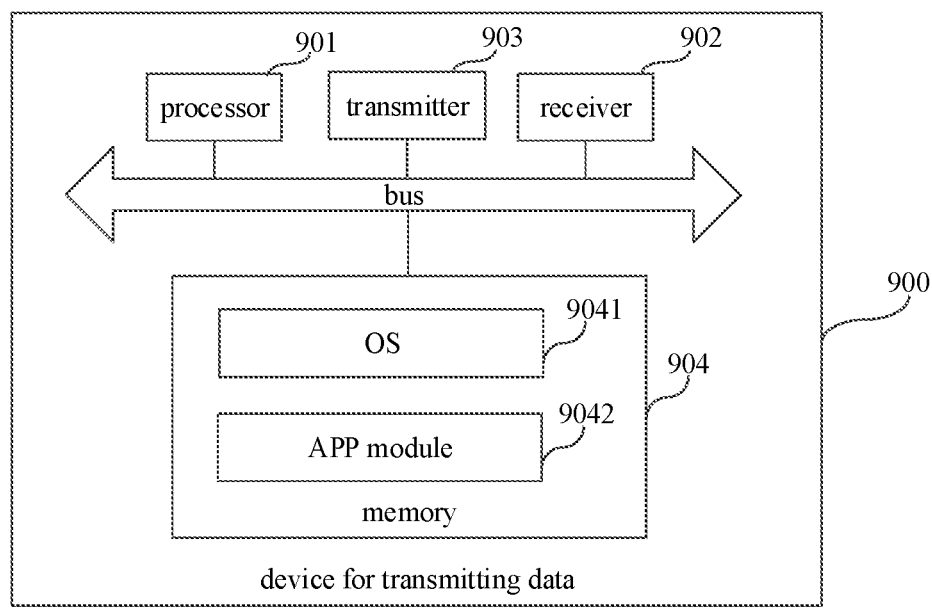
FIG. 9 is a block diagram of a device for transmitting data according to an illustrative embodiment.

FIG. 9 is a block diagram of a device 900 for transmitting data according to an illustrative embodiment. For example, the device 900 for transmitting data may be access network equipment. As shown in FIG. 9, the device 900 for transmitting data may include a processor 901, a receiver 902, a transmitter 903, and a memory 904. The receiver 902, the transmitter 903, and the memory 904 are respectively connected to the processor 901 via a bus.

The processor 901 includes one or more processing cores. The processor 901 performs a method performed by access network equipment in a method for transmitting data provided by embodiments of the present disclosure by executing a software program and a module. The memory 904 may be configured to store the software program and the module. Specifically, the memory 904 may store an operating system 9041 and an application module 9042 needed for at least one function. The receiver 902 is configured to receive communication data sent by other equipment. The transmitter 903 is configured to transmit communication data to other equipment.

Figure 10:
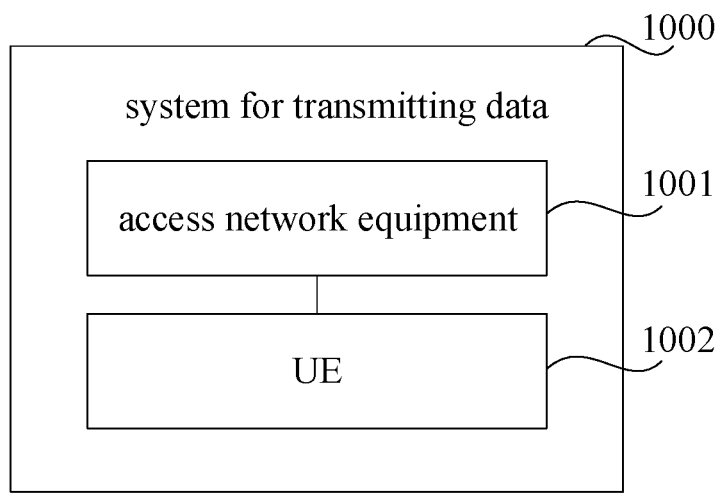
FIG. 10 is a block diagram of a system for transmitting data according to an illustrative embodiment.

FIG. 10 is a block diagram of a system 1000 for transmitting data according to an illustrative embodiment. As shown in FIG. 10, the system 1000 for transmitting data may include access network equipment 1001 and UE 1002.

The access network equipment 1001 may be configured to perform a method for transmitting data performed by access network equipment in the embodiment shown in FIG. 4.

The UE 1002 may be configured to perform a method for transmitting data performed by target UE in the embodiment shown in FIG. 4.

Figure 11:
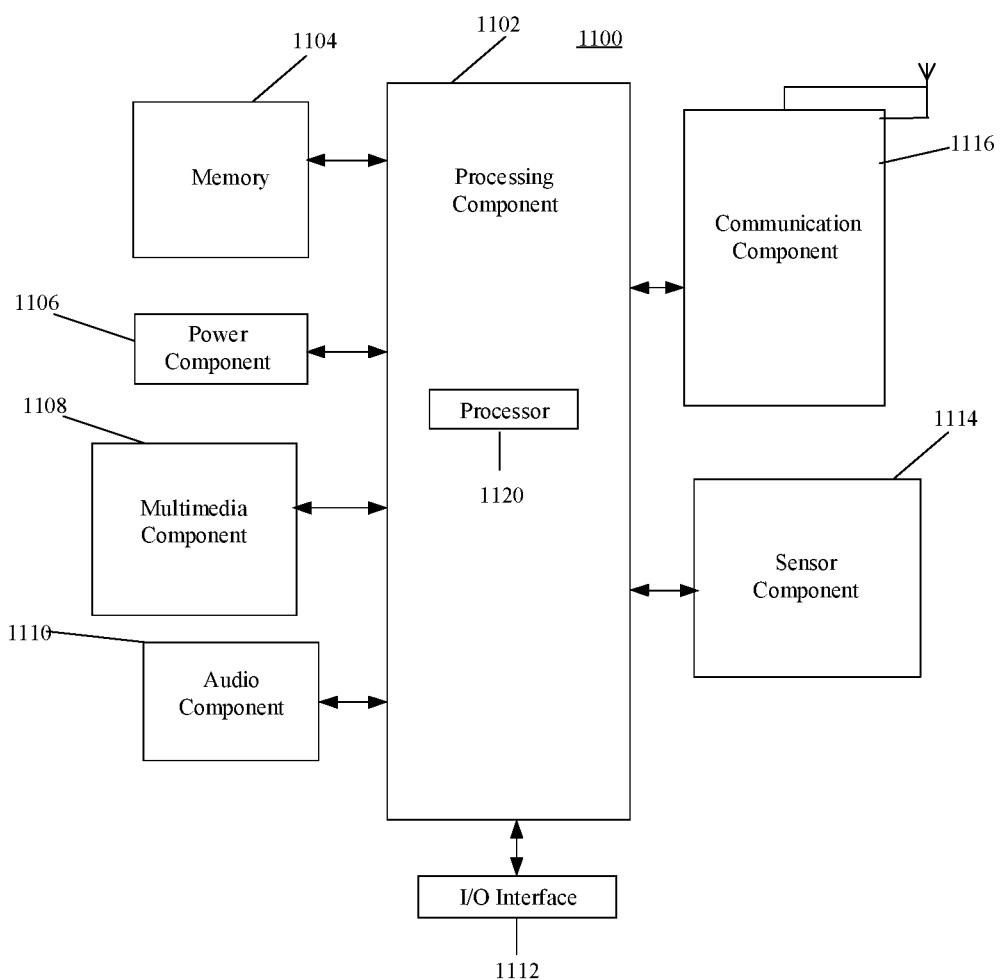
FIG. 11 is a block diagram of a device for transmitting data according to an illustrative embodiment.

FIG. 11 is a block diagram of a device 1100 for transmitting data according to an illustrative embodiment. For example, the device 1100 may be a mobile phone, a computer, a digital broadcasting terminal, a message transceiver, a game console, tablet equipment, medical equipment, fitness equipment, a Personal Digital Assistant (PDA), etc.

Referring to FIG. 11, the device 1100 may include one or more components as follows: a processing component 1102, a memory 1104, a power component 1106, a multimedia component 1108, an audio component 1110, an Input/Output (I/O) interface 1112, a sensor component 1114, and a communication component 1116.

The processing component 1102 generally controls an overall operation of the display equipment, such as operations associated with display, a telephone call, data communication, a camera operation, a recording operation, etc. The processing component 1102 may include one or more processors 1120 to execute instructions so as to complete all or some steps of the method. In addition, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operation on the device 1100. Examples of these data include instructions of any application or method configured to operate on the device 1100, contact data, phonebook data, messages, images, videos, and/etc. The memory 1104 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 1106 supplies electric power to various components of the device 1100. The power component 1106 may include a power management system, one or more power supplies, and other components related to generating, managing and distributing electric power for the device 1100.

The multimedia component 1108 includes a screen providing an output interface between the device 1100 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 1108 includes a front camera and/or a rear camera. When the device 1100 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 1110 is configured to output and/or input an audio signal. For example, the audio component 1110 includes a microphone (MIC). When the device 1100 is in an operation mode such as a call mode, a recording mode, and a voice recognition mode, the MIC is configured to receive an external audio signal. The received audio signal may be further stored in the memory 1104 or may be sent via the communication component 1116. In some embodiments, the audio component 1110 further includes a loudspeaker configured to output the audio signal.

The I/O interface 1112 provides an interface between the processing component 1102 and a peripheral interface module. The peripheral interface module may be a keypad, a click wheel, a button, etc. These buttons may include but are not limited to: a homepage button, a volume button, a start button, and a lock button.

The sensor component 1114 includes one or more sensors for assessing various states of the device 1100. For example, the sensor component 1114 may detect an on/off state of the device 1100 and relative location of components such as the display and the keypad of the device 1100. The sensor component 1114 may further detect a change in the location of the device 1100 or of a component of the device 1100, whether there is contact between the device 1100 and a user, the orientation or acceleration/deceleration of the device 1100, and a change in the temperature of the device 1100. The sensor component 1114 may include a proximity sensor configured to detect existence of a nearby object without physical contact. The sensor component 1114 may further include an optical sensor such as a Complementary Metal-Oxide-Semiconductor (CMOS) or Charge-Coupled-Device (CCD) image sensor used in an imaging application. In some embodiments, the sensor component 1114 may further include an acceleration sensor, a gyroscope sensor, a magnetic sensor, a pressure sensor, or a temperature sensor.

The communication component 1116 is configured to facilitate wired or wireless/radio communication between the device 1100 and other equipment. The device 1100 may access a radio network based on a communication standard such as WiFi, 2G, 3G, . . . , or a combination thereof. In an illustrative embodiment, the communication component 1116 broadcasts related information or receives a broadcast signal from an external broadcast management system via a broadcast channel. In an illustrative embodiment, the communication component 1116 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative embodiment, the device 1100 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method performed by target UE in the method for transmitting data provided by embodiments of the present disclosure.

In an illustrative embodiment, a transitory or non-transitory computer-readable storage medium including instructions, such as the memory 1104 including instructions, is further provided. The instructions may be executed by the processor 1120 of the device 1100 to implement the method performed by target UE in the method for transmitting data provided by embodiments of the present disclosure. For example, the computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A computer-readable storage medium may be provided. The computer-readable storage medium may be transitory or non-transitory computer-readable storage medium. The computer-readable storage medium may include a computer program. When executed by a processing component, the computer program may implement a method for transmitting data provided in the embodiments of the present disclosure. For example, the method for transmitting data may be: performing detection on n target PDCCHs, each of the target PDCCHs carrying target DCI, the target DCI being configured for scheduling the target UE; and when the target DCI is detected on a target PDCCH, receiving, as scheduled by the target DCI, downlink data sent by the base station to the target UE.

Alternatively, the method for transmitting data may be: generating DCI for scheduling target UE, the target UE being configured to receive, as scheduled by the target DCI, downlink data sent by the base station to the target UE; and sending the target DCI respectively through n target PDCCHs.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

What is claimed is:

1. A method for transmitting data, comprising:
detecting, by a user equipment (UE), n target Physical Downlink Control Channels (PDCCHs), each PDCCH of the n target PDCCHs carrying target Downlink Control Information (DCI), the target DCI being configured for scheduling a target UE, n being an integer greater than one; and
in response to detecting the target DCI on at least one PDCCH of the n target PDCCHs, receiving, by the UE and as scheduled by the target DCI, downlink data sent by an access network equipment to the target UE,
wherein in response to detecting the target DCI on the at least one PDCCH of the n target PDCCHs, receiving, by the UE and as scheduled by the target DCI, the downlink data sent by the access network equipment to the target UE comprises:
in response to detecting the target DCI on a first target PDCCH of the n target PDCCHs, acquiring n−1 pieces of the target DCI detected on a second PDCCH to an n-th target PDCCH of the n target PDCCHs;
determining scheduling information jointly indicated by n pieces of the target DCI; and
receiving, according to the scheduling information, the downlink data sent by the access network equipment to the target UE.

2. The method of claim 1, wherein detecting the n target PDCCHs comprises:
determining a non-using aggregation level for the n target PDCCHs; and
detecting the n target PDCCHs based on an aggregation level other than the non-using aggregation level.

3. The method of claim 2, wherein determining the non-using aggregation level for the n target PDCCHs comprises at least one of following acts:
receiving a set of non-using aggregation levels sent by the access network equipment; or
receiving a set of using aggregation levels sent by the access network equipment; and determining any aggregation level other than the using aggregation levels as the non-using aggregation level for the n target PDCCHs; or
determining the non-using aggregation level for the n target PDCCHs as specified by a communication protocol.

4. The method of claim 1, wherein different aggregation levels are used for at least two of the n target PDCCHs.

5. The method of claim 1, further comprising:
receiving number-of-times indication information sent by the access network equipment, the number-of-times indication information being configured to indicate a number of times that the access network equipment sends the target DCI; and determining the number of times indicated by the number-of-times indication information as n.

6. The method of claim 1, wherein acquiring the n−1 pieces of the target DCI detected on the second PDCCH to the n-th target PDCCH comprises:

determining a search parameter in detecting the target DCI on the first target PDCCH, the search parameter comprising at least one of a first aggregation level or a first search space; and detecting the n−1 pieces of the target DCI on the second PDCCH to the n-th target PDCCH using the search parameter.

7. The method of claim 1, wherein acquiring the n−1 pieces of the target DCI detected on the second PDCCH to the n-th target PDCCH comprises:

acquiring a set of Radio Network Temporary Identities (RNTIs) for the second PDCCH to the n-th target PDCCH, the set of RNTIs comprising at least one RNTI;

detecting each of the second PDCCH to the n-th target PDCCH using an RNTI in the set of RNTIs until the target DCI is detected; and acquiring the n−1 pieces of the target DCI detected on the second PDCCH to the n-th target PDCCH.

8. The method of claim 7, further comprising:

acquiring a first RNTI used to detect the target DCI on the first target PDCCH;

acquiring n−1 second RNTIs respectively corresponding to the second PDCCH to the n-th target PDCCH, a respective RNTI of the n−1 second RNTIs being used to detect the target DCI on a target PDCCH corresponding to the respective RNTI; and determining, according to a first sequence formed by the first RNTI and the n−1 second RNTIs, target indication information for scheduling the target UE.

9. The method of claim 8, wherein determining the target indication information according to the first sequence of the first RNTI and the n−1 second RNTIs comprises:

receiving at least one correspondence sent by the access network equipment, each of the at least one correspondence being a correspondence between indication information and a sequence of n RNTIs; and acquiring the target indication information corresponding to the first sequence by searching the at least one correspondence.

10. The method of claim 8, wherein the first RNTI is configured to uniquely identify the target UE.

11. A method for transmitting data, comprising:

generating, by an access network equipment, target Downlink Control Information (DCI) for scheduling a target User Equipment (UE), the target UE being configured to receive, as scheduled by the target DCI, downlink data sent by the access network equipment to the target UE; and sending, by the access network equipment, the target DCI respectively through n target Physical Downlink Control Channels (PDCCHs), n being an integer greater than one, wherein n pieces of the target DCI are configured to jointly indicate scheduling information, the scheduling information being configured to schedule the target UE, n being a number of times the access network equipment sends the target DCI.

12. The method of claim 11, wherein sending the target DCI respectively through the n target PDCCHs comprises:

determining a non-using aggregation level for the n target PDCCHs; and mapping the target DCI respectively to the n target PDCCHs, and sending the target DCI through the n target PDCCHs, an aggregation level of the n target PDCCHs being an aggregation level other than the non-using aggregation level.

13. The method of claim 12, further comprising at least one of following acts:

sending, to the target UE, a set of non-using aggregation levels; or sending, to the target UE, a set of using aggregation levels.

14. The method of claim 11, further comprising:

sending number-of-times indication information to the target UE, the number-of-times indication information being configured to indicate the number of times that the access network equipment sends the target DCI, the target UE being configured to determine the number of times indicated by the number-of-times indication information as n.

15. The method of claim 11, wherein sending the target DCI respectively through the n target PDCCHs comprises:

acquiring target indication information for scheduling the target UE;

determining a first sequence of n Radio Network Temporary Identities (RNTIs) corresponding to the target indication information, each of the n RNTIs being located in a set of RNTIs, the set of RNTIs comprising at least one RNTI;

scrambling the n pieces of the target DCI respectively using the n RNTIs according to the first sequence; and sending the n pieces of the target DCI respectively through the n target PDCCHs.

16. The method of claim 15, wherein the n RNTIs comprise a first RNTI for scrambling a first piece of the target DCI of the n pieces of the target DCI, the first RNTI being configured to uniquely identify the target UE.

17. A device for transmitting data, comprising:

a processor; and a memory configured to store processor executable instructions, wherein the processor is configured to implement:

detecting n target Physical Downlink Control Channels (PDCCHs), each PDCCH of the n target PDCCHs carrying target Downlink Control Information (DCI), the target DCI being configured for scheduling a target UE, n being an integer greater than one; and in response to detecting the target DCI on at least one PDCCH of the n target PDCCHs, receiving, as scheduled by the target DCI, downlink data sent by an access network equipment to the target UE, wherein the processor is configured to receive the downlink data sent by the access network equipment to the target UE as scheduled by the target DCI in response to detecting the target DCI on the at least one PDCCH of the n target PDCCHs, by:

in response to detecting the target DCI on a first target PDCCH of the n target PDCCHs, acquiring n−1 pieces of the target DCI detected on a second PDCCH to an n-th target PDCCH of the n target PDCCHs;

determining scheduling information jointly indicated by n pieces of the target DCI; and receiving, according to the scheduling information, the downlink data sent by the access network equipment to the target UE.

18. The method of claim 15, further comprising: sending at least one correspondence to the target UE, each of the at least one correspondence being a correspondence between indication information and a sequence of the n RNTIs.

* * * * *